United States Patent Office 2,891,875
Patented June 23, 1959

2,891,875

SILICONE-SILICIOUS PIGMENT DISPERSION PROCESS AND PRODUCT

Ellis Hall Phreaner, Los Angeles, Calif., assignor of one-third to H. Calvin White, Pasadena, Calif.

No Drawing. Application September 19, 1955
Serial No. 535,293

12 Claims. (Cl. 106—308)

This invention has to do generally with the making of silicic pigments or fillers, termed "silicic" in that they are derived from precipitation or insolubilizing of the silicate radical of water soluble silicates, and to the manufacture of various products containing the pigment or filler. Particularly contemplated are new methods and resulting products involving the formation and use of pigments or fillers having exceptional fineness made possible by coating of the particles as they are formed or precipitated, with a fluid insoluble polysiloxane, preferably in the form of an oil, the effect of which is to prevent or limit agglomeration or polymerization of the silicate-derived particles as they are precipitated, and following precipitation.

At the outset it may be observed that the invention is applicable broadly to the formation and coating of water insoluble silicic pigments, i.e., silica-containing particles formed through precipitation by any of the known methods of the silicate or silica content of the water soluble silicates, of which the alkali metal silicates are the common examples. The particular chemistry of the precipitation and the particular composition of the precipitate, so long as it is silicic and water insoluble, are secondary to the essential concept of preventing or limiting the agglomeration or polymerization of such insoluble compounds or mixtures thereof as may be formed, and to thereby arrive at the distinct and important advantages later described, which result from the physical state of the filler or pigment (hereinafter referred to for convenience as a "filler"), namely its exceptional fineness in ultimate particle size and ready reducibility to such from any loose agglomerated form the filler might take.

Broadly contemplated is formation of a silicic precipitate by any suitable method or reaction whereby all or the $SiO_2$ portion of the silicate radical of a water soluble silicate may be insolubilized in extremely fine particle form in an aqueous medium. The most practicably useable silicates are the alkali metal silicates, the alkali-silica ratios of which need not be narrowly limited since, broadly, the only requirement is that an insoluble precipitate be formed. Merely as illustrative, I have successfully used sodium silicates having alkali-silica ratios from 1:1.60 to 1:3.75, and potassium silicates having the corresponding ratios as high as 1:3.29.

As to the precipitation methods used, the soluble silicate may be reacted with any of various water soluble metallic compounds capable of forming an insoluble precipitate suitable for use as a filler, and of which such salts as the soluble chlorides and sulphates of calcium, magnesium, zinc, and aluminum are typical. Of these, the soluble alkaline earth metal salts, and particularly the chlorides, have preference for many types of fillers. Also contemplated are such other methods of reducing the silicate to a silicic precipitate or by ion exchange removal of the alkali metal through the use of zeolites. Depending upon the specific reactants and conditions employed in any particular instance, the precipitate may be a metallic silicate, silica and metallic oxide, or mixtures of these. And the extent to which silicon and/or metal oxide will appear in the precipitate may be influenced and increased to a considerable degree by reason of the effect of the siloxane coating in suppressing or limiting the formation relatively large size compounds or complexes containing them. It is found that the precipitated filler tends to be essentially amorphous in character, thus indicating that the partitioning effect of the siloxane, with respect to particles in their initial or incipient state of precipitation, inhibits the formation of crystalline addition products in favor of the amorphous states.

The invention contemplates the use of any of the polysiloxanes which, in aqueous dispersion, are capable of coating the filler particles as they precipitate. I have used successfully various polysiloxanes which are in fluid form, existing, at least at the time of application to the filler particles, in a liquid or oily form. As will be appreciated, the essential requirement of the polysiloxane is that it be readily dispersible or emulsifiable in small or minute particles form in water, and that it has sufficient fluidity to apply to and coat the filler particles as a water insoluble barrier between otherwise coalescent particles. I prefer to use silicone oils, desirably of a free-flowing viscosity such as "Linde L-45" grade silicone oil, which are completely polymerized, thermally stable liquid polymeric dihydrocarbon substituted siloxanes in which the substituent groups are of the class consisting of alkyl, aryl and vinyl groups, and they may be of open chain or cyclic structure.

Particularly good results have been accomplished with silicone polymers preponderately of the thermally stable open chain dimethyl substituted siloxanes with trimethylsiloxy or other fully saturating or blocking end groups, and having the general formula:

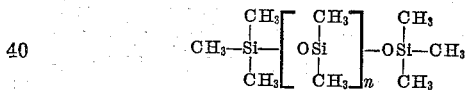

where "$n$" may be any number from 4 to any larger number permitted to the extent of the siloxane remaining liquid.

As illustrative of the cyclic silicone polymers, I may use cyclic dimethylsiloxane polymers of the general formula $[(CH_3)_2SiO]_x$, where "$x$" may be a number ranging, for example, from 3 to 8 inclusive, or above.

It is further observed that other alkyl, aryl or vinyl radicals may be substituted for the methyl groups for such purposes as to have a modifying effect on the physical characteristics of the polymerization product, and particularly for the purposes of the invention, to afford better dispersion qualities in compounding of rubber formulae, and corresponding improvement in the finished products.

In more specific reference to the physical method employed in accordance with the invention, the steps need include only the simple procedure of reacting a dilute aqueous solution of the silicate with one or a mixture of precipitating agents, e.g., a water soluble metallic salt, in the presence of finely dispersed or emulsified silicone, preferably a dihydrocarbon substituted siloxane, having a physical form or degree of fluidity such that it will coat the silicious precipitate as it is formed. Conveniently, and typically, I may first form an emulsion of silicone oil in dilute aqueous alkali metal silicate solution, maintaining complete and uniform dispersion or emulsification of the disperse phase silicone by active mechanical agitation, and introduce to the agitated mixture an aqueous solution of the precipitating agent, typically either or both an alkaline earth metal chloride and aluminum chloride. As silicious precipitate forms, the particles are immediately coated with the silicone oil, the effect of which is in the nature of a partitioning agent tending (1) to maintain the filler particles in their initially formed state and chemical composition and thus limit and, to a very large degree, prevent chemical union between particles which are insoluble, stable, but chemically different, such, for example, as silica and metallic oxide; and (2) in this manner also to limit the particle formations to extremely small size, and which are essentially amorphous as distinguished from a more crystalline precipitate which otherwise would result from chemical union of, say, silica and metal oxide. While to the chemist will be recognized the amount of precipitating agent required to precipitate the silicate radical from any given quantity of alkali metal silicate, it may be mentioned that in general the quantity of a water soluble metallic salt or other metallic compound reactive with or that can be mixed with the silica to form the silicious precipitate, will have a mole weight ratio to alkali metal silicate from about 2:1 to 5:1.

As explained at greater length in my copending application, Serial Number 413,470, filed March 1, 1954, on Silicone Supplemented Fillers and Rubbers, and Methods for Their Manufacture, a particular relation appears to exist between the surfaces of a silicic particle and the oriented Si–O side of the silicone molecule, in that the work of adhesion between the surfaces of a silicic particle is greater than the adhesion relation between the silicone molecule and the water phase. The result is a preferential binding of the silicone to the silicic particle which results in an oriented tight packing of organic groups. Seemingly the silicone coating on the particle may be mono-molecular or greater than one molecule in thickness. Depending upon such factors as the size of the filler particles and the amount and viscosity of the silicone, the ratio of silicone oil to filler will be reached when the adhesive force of the filler particle or the silicone molecules will not exceed the intra-surface tension between the silicone and water phase. When this point is reached, no more oil can be absorbed by the filler particle from the water phase. Generally, the weight ratio of the silicone oil to the coated filler will be between about 3% to 50%.

Fillers made in accordance with the invention are useful for many purposes as, for example, for inclusion as water slurries in emulsion type coatings or in dry form in oil to render them water resistant, in resinous plastic compositions, and also in natural of synthetic rubbers. As applied to the improvement of rubbers, the coated filler, in its very finely divided amorphous form, gives increased tensile strength, elongation, and "modulus," as determined by the standard tests, as well as considerably reduced water absorption. Generally, the filler will be used in rubbers in amounts such that the silicone content of the filler will be between about 1.5 to 25 weight percent of the vulcanized rubber. The following are illustrative of the general class of synthetic rubbers that are benefited by use of the present improved filler: butadiene-styrene, butadiene-acrylonitrile, chloroprene, chloroprene-isoprene, chloroprene-acrylonitrile polymers, and copolymers, and poly-acrylic synthetic rubbers.

Chemical, microscopic and X-ray diffraction analysis and examination has shown that the material produced by the reaction in the presence of the mechanically emulsified siloxane differs materially, in other respect than in particle size, from the same reaction product carried out lacking the presence of the water phase oriented silicones. The ratio of amorphous silica to crystalline silicates shows considerable increase; the presence of crystalline silicates is small; calcium or aluminum oxides are present as amorphous bodies absorbed onto silica particles, and are easily removed by leaching with hydrochloric acid. Soluble salts which remain after the first filtering can be readily leached out by rewashing.

The qualities of the filler product formed in the presence of the silicone oils produce very noticeably different properties, when compounded with elastomers, as compared with the filler product of like chemical reactions carried out in the absence of the silicone oil emulsification. In Buna N rubber compositions the silicone coated filler gives a clear transparent sheet due to dispersion qualities and to a filler refractive index of 1.44 to 1.47 (crystalline silicates having a refractive index of 1.55), while with silicate fillers of the same reaction, produced without the presence of the emulsified silicone oil, are opaque. The preferred silicic fillers of this process also give higher tensiles, modulus, tear resistance and much lower water absorption than do the filler products of the reaction without silicones, and, in fact, give lower water absorption at elevated temperatures than do compositions reinforced with silicone-filler dispersions produced by a uniform dry milling process of filler coating.

Electron micrographs at 86,800× magnification of a fine particle silicic filler (prepared by the method of this invention) Buna N composition, in solvent dispersion, demonstrate that a great preponderance of the filler particles are of less than 10 millimicrons.

EXAMPLE I

To 300 gms. of sodium silicate having an alkali-silica ratio of 1:3.22 diluted with 500 gms. of distilled water, 30 gms. of a dimethyl silicone oil of 50 centistokes viscosity were added, and the mixture was mechanically agitated with an electric mixer to effect an emulsion of the oil (Mix A).

240 ml. of an 18% solution of calcium chloride and 435 ml. of a 10% solution of aluminum chloride were combined (Mix B).

Mix A (with constant agitation) was delivered to a recirculating system consisting of a centrifugal pump, a return line including a Venturi orifice and a beaker reservoir, the system containing 2500 ml. distilled water. The chloride solution was then slowly delivered through a funnel to an opening at the center of the pump housing of the revolving blades.

The precipitate was filtered with No. 3 filter paper and a vacuum, giving a clear filtrate. It was reslurried with 2000 ml. of distilled water and refiltered. It was then oven dried for sixteen hours at 300° F.

The product was a very fine particle silicic filler coated with a silicone oil. It was completely hydrophobic and very soft and friable even in the dried cake form.

Chemical analysis of the product showed it to contain by weight percentage:

| | Percent |
|---|---|
| Silicon oil | 8.32 |
| SiO$_2$* | 60.90 |
| CaO | 7.70 |
| Al$_2$O$_3$ | 6.60 |
| H$_2$O* | 14.70 |

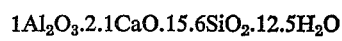
* Exclusive of the SiO$_2$ in the silicone oil molecule.

Figured as a calcium aluminum silicate, the composition would have a molar ratio of $$1Al_2O_3 \cdot 2.1CaO \cdot 15.6SiO_2 \cdot 12.5H_2O$$

Microscopic examination showed that the silicic material consisted in large part of an amorphous silica having a refractive index of 1.435 to 1.455 with a very small proportion of birefringent crystalline material having a much higher refractive index, 1.545–1.55—no doubt calcium aluminum silicates. These birefringent crystalline species are removed by leaching with dilute hydrochloric acid, although the whole sample did not wet. On drying, the refractive index of the leached amorphous material was not changed.

X-ray diffraction examination showed this material to be almost entirely amorphous. A very few weak lines indicating the possibility of a very small amount of crystalline $CaSiO_3$, hydrous aluminum silicate, is also possible. The product of the same reaction, but without the addition of a silicon oil, gave higher calcium and aluminum, and showed the presence of birefringent crystalline material, although containing amorphous silica.

*Performance in rubber composition*

The filler of the reaction product in the presence of mechanically emulsified silicone oil when compounded with Buna N rubber gave, even in the uncured state, a transparent sheet at .050" thickness. In the cured slab at .75" thickness it was completely transparent, while the same composition using the filler from the reaction without the silicone oil gave a completely opaque composition.

The two fillers were compounded according to the following formula:

|  | Silicic Filler Products | |
| --- | --- | --- |
|  | With Silicones | Without Silicones |
| Buta-acrylonitrile copolymer | 100.00 | 100.00 |
| Silicic filler | 60.00 | 60.00 |
| Dimethyl silicone oil | 5.00 |  |
| Di-octyl phthlate |  | 15.00 |
| Zinc Oxide | 1.00 | 1.00 |
| Stearic Acid | .50 | .50 |
| Tetramethylthiuram disulfide | 2.75 | 2.75 |
| N-Cyclohexyl 2 benzothiazole sulfenamid | 1.75 | 1.75 |

PHYSICAL QUALITIES

| Tensile, p.s.i. | 2,525 | 1,700 |
| --- | --- | --- |
| Modulus 300% | 475 | 370 |
| Elongation, percent | 875 | 910 |

WATER ABSORPTION

| At room temperature, 24 hrs | 0.59 | 2.86 |
| --- | --- | --- |
| At room temperature, 168 hrs | 1.92 | 4.53 |
| At 100° C, 24 hrs | 5.14 | 9.85 |

EXAMPLE II

To 200 gm. of "N" (Phila Quartz) sodium silicate ($SiO_2$ 3.22—$Na_2O$ 1.00) 14.25 gms. of a dimethyl silicone oil having a viscosity of 500 cstks. and 1200 ml. of distilled water were added with mechanical agitation. The mixture (designated as Mix A) was recirculated through a colloid mill with a setting at .016" clearance for five minutes.

288 ml. of an 18% calcium chloride solution was further diluted by the addition of 1600 ml. of distilled water (Mix B).

To a beaker containing 200 ml. of distilled water, Mix A (directly from the colloid mill) and Mix B were slowly added with active mechanical agitation.

The cloudy precipitate slurry was then filtered, giving a clear filtrate. It was then reslurried with 1600 ml. of distilled water with active mechanical agitation.

The product was a silicic fine particle filler which was completely hydrophobic.

Chemical analysis gave:

|  | Percent |
| --- | --- |
| Dimethyl silicone oil | 5.25 |
| $SiO_2$ | 51.00 |
| CaO | 18.75 |
| $H_2O$* | 7.74 |

* Exclusive of the SiO in the silicone oil.

If the $SiO_2$, CaO and $H_2O$ were combined as a calcium silicate, this analysis would give a molar ratio of 1.0CaO, 2.53$SiO_2$, 1.3$H_2O$.

Microscopic examination showed a large proportion of amorphous silica. The amount of birefringent crystal structure was small. X-ray diffraction examination showed the material to be almost entirely amorphous. It would appear that the calcium was present in solid solution, rather than as a crystalline calcium silicate, having readily been leached with dilute hydrochloric acid. After drying at 1600° C., the remaining material had a refraction index of 1.42 and, on subsequent ignition above 1000° C., gave a refractive index of 1.465, clearly indicating the absence of any crystalline calcium silicate, and establishing the identity of the material as an amorphous silica.

From these and numerous other experiments it is demonstrable that the material produced from the reaction of soluble silicates with mineral salts, when carried out in the presence of a mechanically emulsified dehydrocarbon substituted polymeric siloxane, differs distinctly in chemical composition and physical structure from the product of similar reactions when the emulsified water oriented silicone molecules are absent. The products of the reactions are silicic materials which are readily dispersable to workable discreet particle sizes not heretofore attainable in silicas, at least in those produced from soluble alkali silicates.

I claim:

1. The process of making siloxane-coated silicic pigment and filler particles that includes, forming said particles in an aqueous solution of a water soluble silicate compound by converting said compound to an insoluble solid precipitate derived from the silicate radical of said compound, and coating the precipitate as it is formed with a polysiloxane oil by dispersing the oil in fine particle form within the solution while maintaining it in a state of active agitation during formation of the precipitate.

2. The process of making siloxane-coated silicic pigment and filler particles that includes forming an agitated aqueous solution of a water soluble silicate compound in which is dispersed in fine particle form a polysiloxane oil, converting said compound to an insoluble solid precipitate derived from the silicate radical of said compound, coating the precipitate as it is formed with said polysiloxane oil, and separating and drying the coated precipitate to a friable powdery product usable in fine discrete particles as a filler.

3. The process of making silicone-coated pigment and filler particles that includes mechanically agitating an emulsion of a dihydrocarbon substituted polysiloxane oil in fine particle form and an aqueous solution of a water soluble silicate compound, and converting said compound in said emulsion to an insoluble precipitate derived from the silicate radical of said compound which becomes coated as it is formed with said polysiloxane oil.

4. The process of making siloxane-coated silicic pigment and filler particles that includes, reacting a water soluble silicate in aqueous solution with a metallic compound dissolved in the solution to convert said soluble silicate to a water-dispersed insoluble silicic precipitate, and coating the precipitate as it is formed with a polysiloxane oil by dispersing the oil in fine particle form within the solution while maintaining it in a state of active agitation during formation of the precipitate.

5. The process of making siloxane-coated silicic pigment and filler particles that includes, reacting a water soluble silicate in aqueous solution with a metallic compound dissolved in the solution to convert said soluble silicate to a water-dispersed insoluble silicic precipitate, coating the precipitate as it is formed with a polysiloxane oil by dispersing the oil in fine particle form within the solution while maintaining it in a state of active agitation during formation of the precipitate, and separating and drying the coated precipitate.

6. The process of making siloxane-coated silicic pigment and filler particles that includes, actively agitating a water solution of a water soluble silicate together with dispersed particles of a polysiloxane oil and a dissolved inorganic metallic compound of the class consisting of water soluble metallic chlorides and sulfates and which is reactive with said silicate to form an insoluble metal silicate precipitate and thereby reacting the silicate with said metallic compound to form said insoluble precipitate and to coat the precipitate with said polysiloxane oil as the precipitate is formed.

7. The process of making siloxane-coated silicic pigment and filler particles that includes, actively agitating a water solution containing dissolved alkali metal silicate, dispersed particles of dimethyl polysiloxane oil emulsified with the solution, and a dissolved inorganic metal salt of the class consisting of water soluble metallic chlorides and sulfates and which is reactive with said silicate to form an insoluble metal silicate precipitate, thereby reacting the silicate with said metal salt to form said insoluble precipitate and to coat the precipitate with said polysiloxane oil as the precipitate is formed, and separating and drying the coated precipitate to a friable powdery product usable in fine discrete particles as a filler.

8. The process as defined in claim 7 in which said silicate is sodium silicate and said metallic salt is calcium chloride.

9. The process as defined in claim 7 in which said silicate is sodium silicate and said metallic salt is aluminum chloride.

10. The process as defined in claim 7 in which the quantity of polysiloxane coating on the precipitate is between about 3 to 50 percent of the weight of the precipitate.

11. The coated precipitate made by the process of claim 2.

12. The coated precipitate made by the process of claim 11.

References Cited in the file of this patent
UNITED STATES PATENTS

| | | |
|---|---|---|
| 2,204,113 | Allen | June 11, 1940 |
| 2,483,836 | McCoy | Oct. 4, 1949 |
| 2,510,661 | Saffron | June 6, 1950 |
| 2,588,828 | Greiner | Mar. 11, 1952 |
| 2,645,588 | Barry | July 14, 1953 |